(12) United States Patent
Mizuki et al.

(10) Patent No.: US 7,821,602 B2
(45) Date of Patent: Oct. 26, 2010

(54) LIQUID CRYSTAL DISPLAY AND MANUFACTURING METHOD THEREOF

(75) Inventors: Masahiko Mizuki, Kanagawa (JP); Tsuyoshi Kamada, Kanagawa (JP)

(73) Assignee: Sony Corporation, Tokyo (JP)

(*) Notice: Subject to any disclaimer, the term of this patent is extended or adjusted under 35 U.S.C. 154(b) by 267 days.

(21) Appl. No.: 11/939,255

(22) Filed: Nov. 13, 2007

(65) Prior Publication Data
US 2008/0123037 A1  May 29, 2008

(30) Foreign Application Priority Data
Nov. 15, 2006  (JP) ............................. 2006-309515

(51) Int. Cl.
G02F 1/1337 (2006.01)
G02F 1/13 (2006.01)

(52) U.S. Cl. ........................................ 349/129; 349/187
(58) Field of Classification Search ................. 349/129
See application file for complete search history.

(56) References Cited

U.S. PATENT DOCUMENTS
2006/0109406 A1* 5/2006 Sasabayashi et al. ........ 349/129

FOREIGN PATENT DOCUMENTS
| JP | 2002-023199 | 1/2002 |
| JP | 2002-357830 | 12/2002 |
| JP | 2003-347314 | 12/2003 |
| JP | 2004-302260 | 10/2004 |
| JP | 2005-024927 | 1/2005 |
| JP | 2005-208309 | 8/2005 |
| JP | 2005-301223 | 10/2005 |
| WO | WO2004/083947 | 9/2004 |

OTHER PUBLICATIONS

Japanese Office Action issued on Jun. 9, 2009 in connection with JP Application No. 2006-309515.
Japanese Office Action dated Sep. 4, 2008 for Application No. 2006-309515.

* cited by examiner

*Primary Examiner*—David Nelms
*Assistant Examiner*—W. Patty Chen
(74) *Attorney, Agent, or Firm*—Sonnenschein Nath & Rosenthal LLP

(57) ABSTRACT

A method of manufacturing a liquid crystal display includes the steps of forming pixel electrodes on inside surfaces of a couple of substrates facing each other, each of the pixel electrodes having gaps; sealing, between the couple of substrates with the pixel electrodes formed, a liquid crystal layer containing a light curing material; and exposing the liquid crystal layer through use of a light shielding film having a plurality of openings, under a voltage applied between a pair of pixel electrodes facing each other on the couple of substrates, where the gaps are alternately disposed to form a staggered arrangement between the pair of pixel electrodes and, spacing between adjacent openings of the light shielding film is smaller than spacing, in a substrate surface direction, between the gap of a pixel electrode on one substrate and the gap of a pixel electrode on the other substrate.

4 Claims, 8 Drawing Sheets

LIQUID CRYSTAL DISPLAY AND MANUFACTURING METHOD THEREOF

CROSS REFERENCE TO RELATED APPLICATIONS

The present invention contains subject matter related to Japanese Patent Application JP 2006-309515 filed in the Japanese patent Office on Nov. 15, 2006, the entire contents of which being incorporated herein by reference.

BACKGROUND OF THE INVENTION

1. Field of the Invention

The present invention relates to a liquid crystal display having a macromolecular dispersive liquid crystal layer containing a curing material, as well as a method of manufacturing the liquid crystal display.

2. Description of the Related Art

Recently, liquid crystal displays have been often used as display monitors of liquid crystal televisions, note book personal computers, car navigations and the like. The liquid crystal displays can be classified into different modes according to the molecular array between panel boards of the liquid crystal displays. For example, a well known is TN (twisted nematic) mode configured by twisted orientation of liquid crystal molecules with no voltage applied thereto. In the TN mode, the liquid crystal molecules have a positive anisotropy of dielectric constant, namely the property that the dielectric constant in the molecular long axis direction is larger than that in the molecular short axis direction. In the structure of the TN mode, the liquid crystal molecules are aligned in a direction vertical to a plane on the board, while rotating in sequence the orientation of liquid crystal molecules in a plane parallel to the board.

Meanwhile, further attention is paid to VA (vertical alignment) mode where the liquid crystal molecules with no voltage applied thereto are aligned vertically to the plane on the board. In the VA mode, the liquid crystal molecules have a negative anisotropy of dielectric constant, namely the property that the dielectric constant in the molecular long axis direction is smaller than that in the molecular short axis direction. This realizes a wider viewing angle than the TN mode.

In the liquid crystal display of the VA mode, light is penetrated by the configuration that in response to the applied voltage, the liquid crystal molecules aligned vertically to the board will lie in a direction parallel to the board due to the negative anisotropy of dielectric constant. However, because the liquid crystal molecules aligned vertically to the board will lie in arbitrary directions, the alignment direction of the liquid crystal molecules is unstable, contributing to deterioration of response properties against voltage.

In view of the foregoing, Japanese Unexamined Patent Application Publications No. 2002-23199 and No. 2002-357830 disclose methods of manufacturing a macromolecular dispersive liquid crystal display, which employ monomers having light-curing property to regulate the alignment direction in response to a voltage. Specifically, as shown in FIG. 9, a liquid crystal layer 300 is sealed between boards 100A and 200A on which there are a pixel electrode 100B and an opposed electrode 200B having slits 400 and 401, respectively. The liquid crystal layer 300 is exposed under irradiation of ultra-violet light to the entire surface of the board 200A. Thus, as shown in FIG. 10, with no voltage applied, the liquid crystal molecules can be held in a slight tilt position (pre-tilt) with respect to the normal line of the board. This enables improvement of response speed against voltage.

SUMMARY OF THE INVENTION

With the abovementioned method, a so-called pre-tilt angle is imparted to almost all of the liquid crystal molecules of the liquid crystal layer, as shown in FIG. 10, because the ultraviolet light is irradiated to the entire surface of the board. Although the pre-tilt provided throughout the entire surface of the liquid crystal layer can improve the response speed against voltage, slight light may be penetrated even in the undriven (black display) state. This increases the luminance of the black display, leading to a drop in contrast.

Generally, in the liquid crystal display having the slits 400 and 401 in upper and lower electrodes disposed between the boards, when a driving voltage is applied, an electrical field is exerted obliquely to the liquid crystal layer. Hence, the liquid crystal molecules are likely to lie in a certain direction, increasing the response speed against voltage in the liquid crystal as a whole. In fact, the electric field is exerted obliquely in a region in the vicinity of the slits within the liquid crystal layer, whereas the electric field will be exerted almost vertically on the board in a region apart from the slits. Therefore, variations in response speed against voltage differ for different regions in the liquid crystal layer. Specifically, for example in case that the pre-tilt regions are imparted, in response to the applied voltage, firstly, the liquid crystal molecules in the regions proximate to the slits 400 and 401 of the liquid crystal layer 300 lie in a direction as shown in FIG. 11. Thereafter, as shown in FIG. 12, in response to the lying of the liquid crystal molecules in the slit-proximate regions, the liquid crystal molecules in the regions apart from the slits 400 and 401 will lie in sequence. Thus, there are properties that the liquid crystal molecules in the slit-proximate regions have sufficiently high response speed against voltage, whereas the liquid crystal molecules apart from the slits have low response speed against voltage. Hence, in order to effectively improve the response speed against voltage with contrast in mind, it seems to be necessary to selectively impart the pre-tilt angle only to liquid crystal molecules existing in a region apart from the electrode slits (the region around the midpoint between the slits).

However, in consideration of the spacing between the slits disposed in the upper and lower electrodes, it is extremely difficult to perform a limited exposure by selecting the pre-tilt region as described above. This is because it is not easy to make precise alignment between the opening position of a mask for selective exposure and the slit position of the electrodes. Accordingly, there is a demand for a liquid crystal display enabling efficient improvement of the response speed against voltage, as well as a method of manufacturing the liquid crystal display.

It is desirable to provide a liquid crystal display enabling efficient improvement of the response speed against voltage, while suppressing a drop in contrast, and provide a method of manufacturing the liquid crystal display.

According to an embodiment of the present invention, there is provided a method of manufacturing a liquid crystal display including the steps of: forming pixel electrodes on inside surfaces of a couple of substrates facing each other, each of the pixel electrodes having gaps; sealing, between the couple of substrates with the pixel electrodes formed, a liquid crystal layer containing a light curing material; and exposing the liquid crystal layer through use of a light shielding film having a plurality of openings, under a voltage applied between a pair of pixel electrodes facing each other on the couple of substrates. Particularly, the gaps are alternately disposed to form a staggered arrangement between the pair of pixel electrodes, and spacing between adjacent openings of the light shielding film is smaller than spacing, in a substrate surface direction, between the gap of a pixel electrode on one substrate and the gap of a pixel electrode on the other substrate.

According to other embodiment of the present invention, there is provided a liquid crystal display including: a couple of substrates facing each other; pixel electrodes formed on inside surfaces of a couple of substrates, each of the pixel electrodes having gaps; and a liquid crystal layer sealed between the couple of substrates with the pixel electrodes formed. Particularly, the gaps are alternately disposed to form a staggered arrangement between the pair of pixel electrodes. The liquid crystal layer has pre-tilt regions where liquid crystal molecules are tilted, spacing between adjacent pre-tilt regions being smaller than spacing, in a substrate surface direction, between the gap of a pixel electrode on one substrate and the gap of a pixel electrode on the other substrate.

In the method of manufacturing the liquid crystal display according to the present invention, exposure to a region having a low response speed against voltage, between the gap of the pixel electrode on one substrate and the gap of the pixel electrode on the other substrate, can be ensured by exposing the liquid crystal layer containing the light curing material, through the light shielding film having the plurality of openings at spacing smaller than the spacing between the respective gaps of the pair of pixel electrodes, with a voltage applied between the pair of pixel electrodes having predetermined gaps. As a result, an obliquely aligned layer (the light curing layer for obliquely aligning the liquid crystal molecules) can be formed in the exposed part. By the presence of the obliquely aligned layer, a pre-tilt angle can be imparted to the liquid crystal molecules in the region having the low response speed. That is, without any precise alignment between the mask for exposure and the pixel electrodes slits, the pre-tilt angle can be imparted efficiently to the region having the low response speed. Here, because no obliquely aligned layer is formed in unexposed regions, no pre-tilt angle is imparted to liquid crystal molecules, and the liquid crystal molecules are aligned vertically to the substrates. However, no issues will occur because even if it corresponds to the slit-proximate region, this region naturally has a high response speed. In the unexposed regions, the liquid crystal molecules are aligned vertically to the substrates, and this is advantageous for black display.

In the liquid crystal display according to the present invention, between the pair of oppositely disposed substrates, the liquid crystal layer is sealed with the pair of pixel electrodes having the predetermined gaps in between. The liquid crystal layer is disposed in the plane directions of the substrates at spacing smaller than spacing between the respective gaps of the pair of pixel electrodes. The liquid crystal layer has the light curing layer for obliquely aligning liquid crystal molecules. This ensures that the light curing layer is provided for the region having the low response speed against voltage in the liquid crystal layer. The presence of the light curing layer ensures that the liquid crystal molecules in the region having the low response speed are held in the pre-tilt state. In the region having no light curing layer, the liquid crystal molecules cannot be held in the pre-tilt state and are aligned vertically to the substrates. However, no issues will occur because if it corresponds to the slit-proximate region, this region naturally has a high response speed. In the unexposed regions, the liquid crystal molecules are aligned vertically to the substrates, and this is advantageous for black display.

The method of manufacturing the liquid crystal display of the present invention includes the steps of: forming pixel electrodes on inside surfaces of a couple of substrates facing each other, each of the pixel electrodes having gaps; sealing, between the couple of substrates with the pixel electrodes formed, a liquid crystal layer containing a light curing material; and exposing the liquid crystal layer through use of a light shielding film having a plurality of openings, under a voltage applied between a pair of pixel electrodes facing each other on the couple of substrates. Particularly, the gaps are alternately disposed to form a staggered arrangement between the pair of pixel electrodes, and spacing between adjacent openings of the light shielding film is smaller than spacing, in a substrate surface direction, between the gap of a pixel electrode on one substrate and the gap of a pixel electrode on the other substrate. This permits manufacture of a liquid crystal display enabling efficient improvement of the response speed against voltage, while suppressing a drop in contrast.

The liquid crystal display of the present invention includes: a couple of substrates facing each other; pixel electrodes formed on inside surfaces of a couple of substrates, each of the pixel electrodes having gaps; and a liquid crystal layer sealed between the couple of substrates with the pixel electrodes formed. The gaps are alternately disposed to form a staggered arrangement between the pair of pixel electrodes. The liquid crystal layer has pre-tilt regions where liquid crystal molecules are tilted, spacing between adjacent pre-tilt regions being smaller than spacing, in a substrate surface direction, between the gap of a pixel electrode on one substrate and the gap of a pixel electrode on the other substrate. This enables efficient improvement of the response speed against voltage, while suppressing a drop in contrast.

Other and further objects, features and advantages of the invention will appear more fully from the following description.

DESCRIPTION OF THE PREFERRED EMBODIMENTS

Preferred embodiments of the present invention will now be described in detail with reference to the accompanying drawings.

Figure 1:
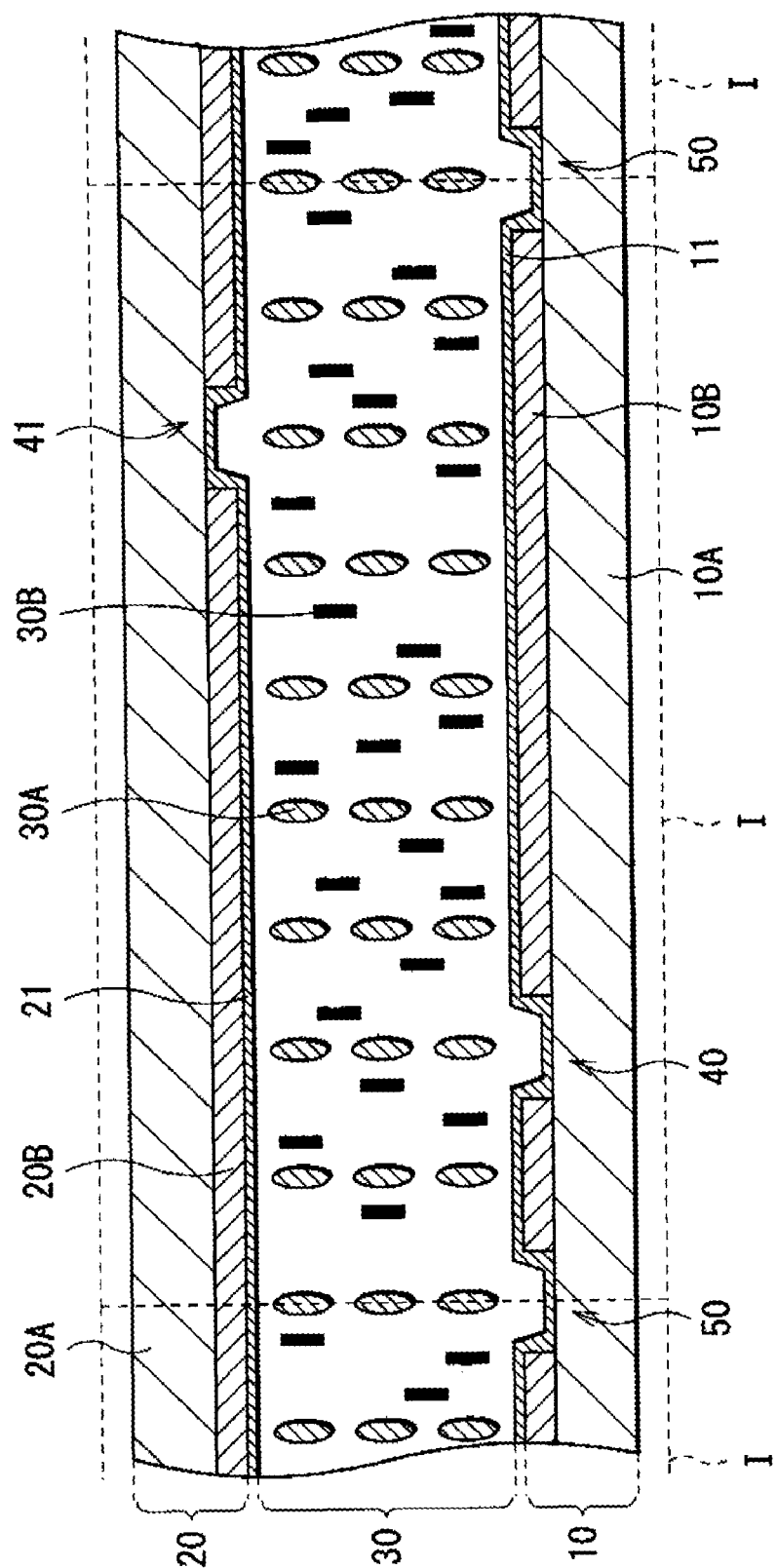
FIG. 1 is a schematic cross-sectional view for explaining a manufacturing step of a liquid crystal panel according to a preferred embodiment of the present invention.
Figure 2:
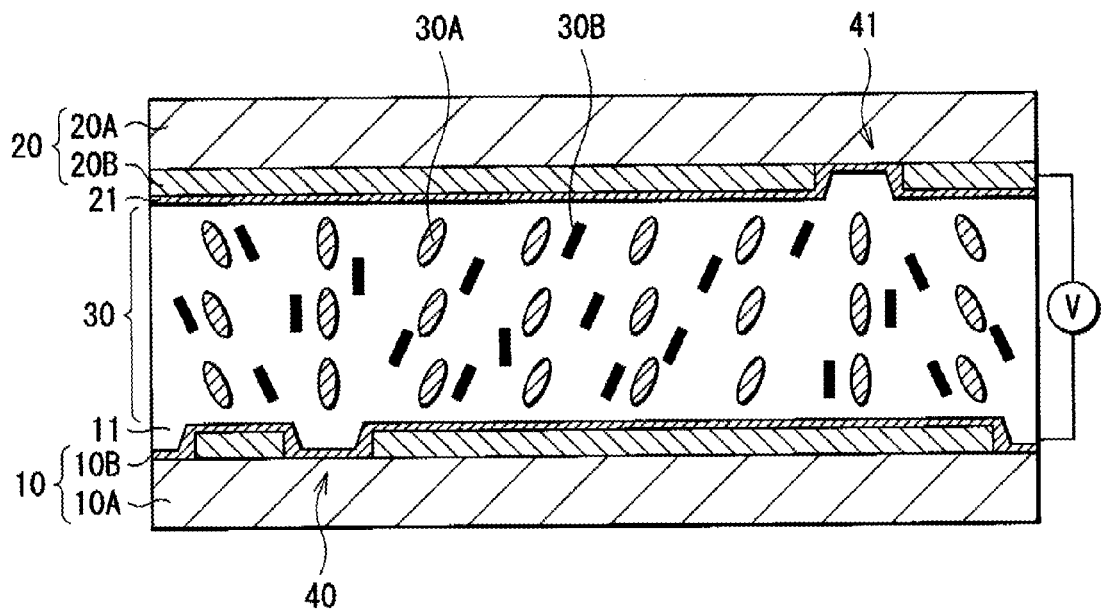
FIG. 2 is a schematic cross-sectional view for explaining the next succeeding step of FIG. 1.
Figure 3:
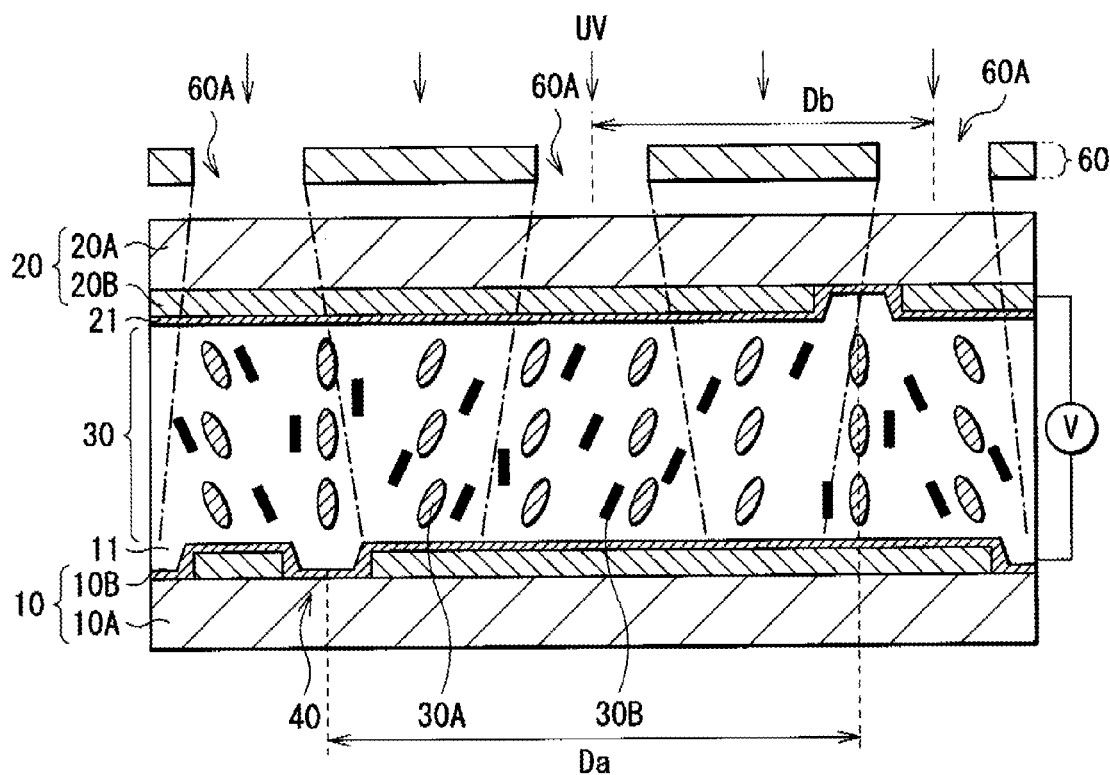
FIG. 3 is a schematic cross-sectional view for explaining the next succeeding step of FIG. 2.

FIGS. 1 to 4 are cross-sectional views schematically illustrating the manufacturing steps of a liquid crystal panel according to a preferred embodiment of the present invention. The method of manufacturing a liquid crystal display includes the step of forming electrodes having predetermined slit parts on surfaces of a pair of boards, respectively, and then sealing a liquid crystal layer between the boards; and the step of exposing the liquid crystal layer through a predetermined light shielding film, under an applied voltage. This method is for manufacturing a liquid crystal panel where a plurality of pixels are formed between the boards, as shown in FIG. 1. For sake of simplicity, FIGS. 2 and 3 show only a region I (a pixel) in FIG. 1. In FIGS. 1 to 4, specific configurations of each board are omitted.

Firstly, as shown in FIG. 1, a TFT (thin film transistor) board 10 and a CF (color filter) board 20 are formed by arranging a pixel electrode 10B and an opposed electrode 20B on the corresponding surfaces of a glass board 10A and a glass board 20A, respectively. A liquid crystal layer 30 is sealed between the TFT board 10 and the CF board 20.

Specifically, the TFT board 10 can be formed by arranging on the surface of the glass board 10A, for example, in a matrix, a plurality of pixel electrodes 10B, a plurality of TFT switching elements each having a gate, a source and drain for driving the pixel electrodes 10B, respectively, and a plurality of signal lines and scanning lines (not shown) connected to the plurality of TFT switching elements, respectively. On the other hand, the CF board 20 can be formed by arranging, on the surface of the glass board 20A, a color filter (not shown) where, for example, red (R), green (G) and blue (B) filters are disposed in a stripe-shape, and the opposed electrode 20B over nearly the entire surface of an effective display region.

Figure 5:
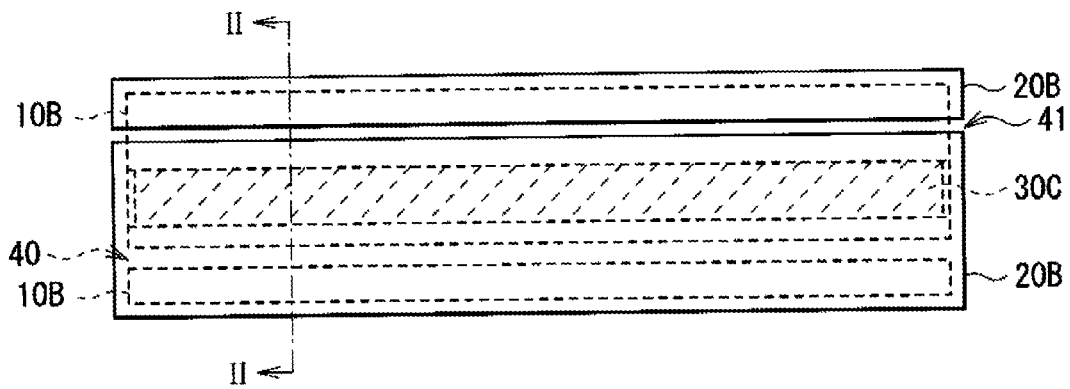
FIG. 5 is a plan view of electrodes of the liquid crystal panel in the preferred embodiment.

In this case, the pixel electrode 10B and the opposed electrode 20B are formed so as to have predetermined slit parts 40 and 41 within a pixel. The slit parts 40 and 41 are portions where no electrode is formed, and for separating the regions in the electrode surface. FIG. 5 shows an example of a plan configuration (a pixel) of the opposed electrode 20B and the pixel electrode 10B as viewed from the side of the CF board 20. As shown in FIG. 5, the slit parts 40 and 41 are disposed alternately so that these are not opposed to each other between the boards 10 and 20. A polymer layer 30C to be described later will be formed in a region between the slit part 40 and the slit part 41. The region I of FIG. 1 corresponds to a cross-sectional view indicated by arrows, taken along the line II-II in FIG. 5. The opposed electrode 20B is provided as an electrode common to the respective pixels, and the pixel electrode 10B is divided on the TFT board by pixel separating parts 50 so as to be provided for each pixel. As an electrode material, those having transparency such as ITO (indium tin oxide) can be used.

Figure 6:
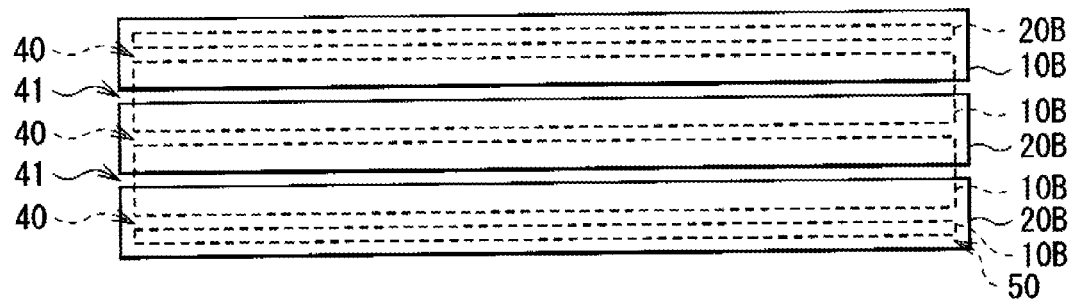
FIG. 6 is a plan view of electrodes having a stripe-shaped pattern.
Figure 7A:
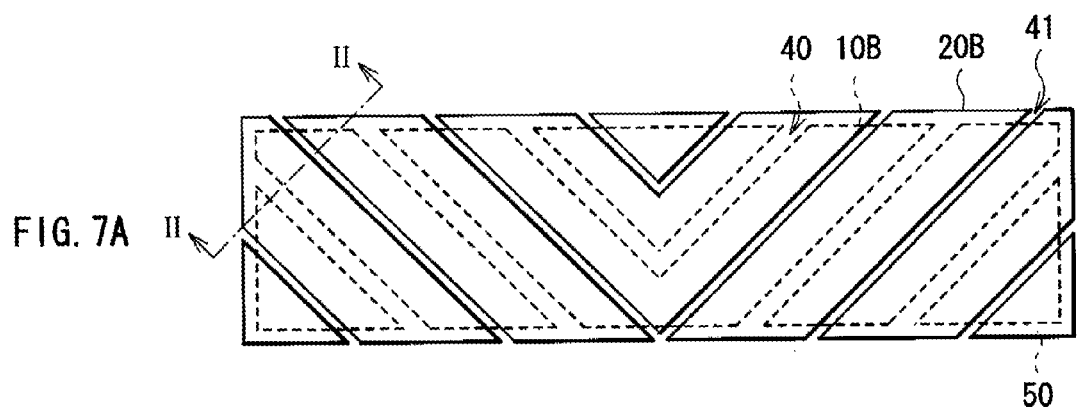
FIGS. 7A to 7C are a plan view of electrodes having a V-shaped pattern, a schematic view of an example of the state of dividing orientation, and a schematic diagram showing the directions of orientation of liquid crystal molecules, respectively.

Alternatively, as shown in FIG. 6, the pixel electrode 10B and the opposed electrode 20B may be formed by a stripe-like pattern having a plurality of slit parts 40 and 41 within a pixel. Alternatively, as shown in FIG. 7A, these may be formed by a V-shaped stripe-like pattern. Without limiting to these patterns, any electrode shape patterns can be used as long as the slit parts 40 and 41 are not opposed to each other.

Subsequently, vertical alignment films 11 and 21 for vertically aligning liquid crystal molecules 30A described later to the boards are formed on the surfaces of the formed pixel electrode 10B and the formed opposed electrode 20B, respectively. This process includes application of a vertical orienting agent, printing of the vertical orientating films on the boards, and firing.

On the other hand, the liquid crystal layer 30 is formed by adding and composing monomers 30B into liquid crystal (negative nematic liquid crystal) molecules 30A having a negative anisotropy of dielectric constant. The liquid crystal molecules 30A have the property that the dielectric constant in the molecular long axis direction is smaller than that in the molecular short axis direction. Due to this, when a driving voltage is off, the long axes of the liquid crystal molecules 30A are oriented vertically to the boards, and when the driving voltage is on, the long axes of the liquid crystal molecules 30A are oriented in a tilted position parallel to the boards. The monomers 30B has light curing property, namely the property that, under irradiation of ultra-violet light etc, they are polymerized to be polymer and therefore cured. For example, the monomers 30B is composed of 4,4'-diacryloyloxybiphenyl. The content of the monomers 30B is approximately 0.01 to 10% by weight.

Next, spacers for ensuring a cell gap, such as plastic beads, are dispersed in either surface of the TFT board 10 or the CF board 20 (the surface where the vertical alignment films 11 and 21 are formed). Subsequently, a seal part is printed using epoxy adhesive or the like by, for example, screen printing method. Thereafter, the TFT board 10 and the CF board 20 are stuck to each other with the spacers and the seal part in between, so that the vertical orientating films 11 and 21 formed on these boards, respectively, can be opposed to each other. It is followed by admission of the liquid crystal layer 30. The seal part is then cured by heating or the like, so that the liquid crystal layer 30 can be sealed between the TFT board 10 and the CF board 20.

As shown in FIG. 2, a voltage V is applied between the pixel electrode 10B and the opposed electrode 20B. For example, the voltage V of 10V to 20V is applied for about 10 to 60 seconds. Thus, an electric field is exerted obliquely to the long axes of the liquid crystal molecules 30A, causing the liquid crystal molecules 30A to be oriented and tilted in one direction.

Then, as shown in FIG. 3, the monomers 30B in the liquid crystal layer 30 are polymerized (to be a polymer layer 30C described later) under irradiation of ultra-violet light UV to the liquid crystal layer 30, with the above voltage V applied. At this time, the liquid crystal layer 30 is selectively exposed through a mask 60 having a plurality of openings 60A. The openings 60A are disposed so that the spacing (opening pitch) Db between the adjacent openings 60A is smaller than the spacing (slit spacing) between the slit part 40 of the pixel electrode 10B and the slit part 41 of the opposed electrode 20B, preferably so that the opening pitch Db is smaller than a half of the slit spacing Da. More preferably, it is set so that the length ratio of the opening pitch Db and the slit spacing Da becomes an irrational number.

Figure 8A:
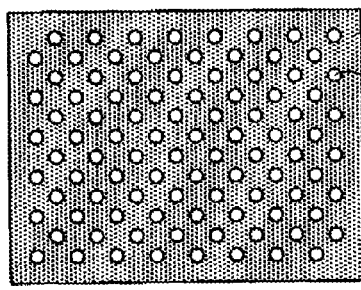
FIGS. 8A to 8H are plan views illustrating opening pattern examples of masks for the liquid crystal panel in the preferred embodiment, respectively.
Figure 8E:
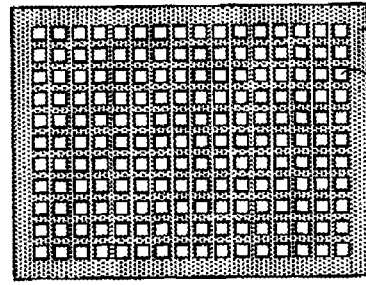
Figure 8B:
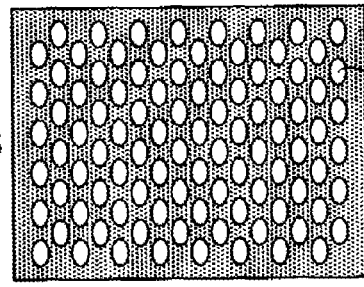
Figure 8F:
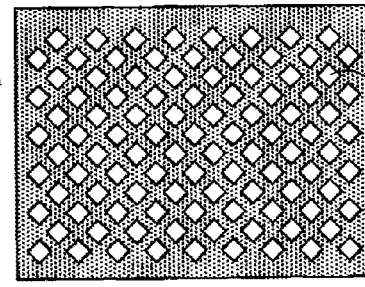
Figure 8C:
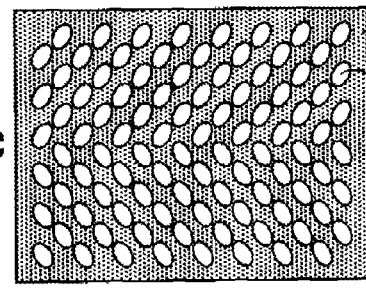
Figure 8G:
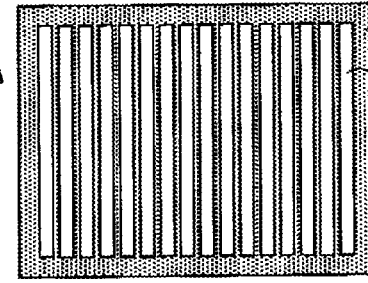
Figure 8D:
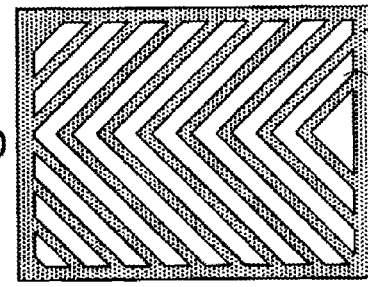
Figure 8H:
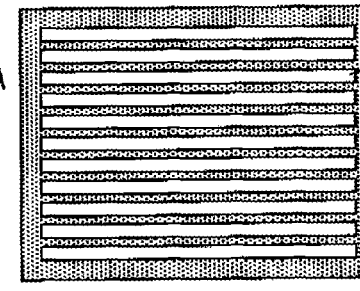
Figure 9:
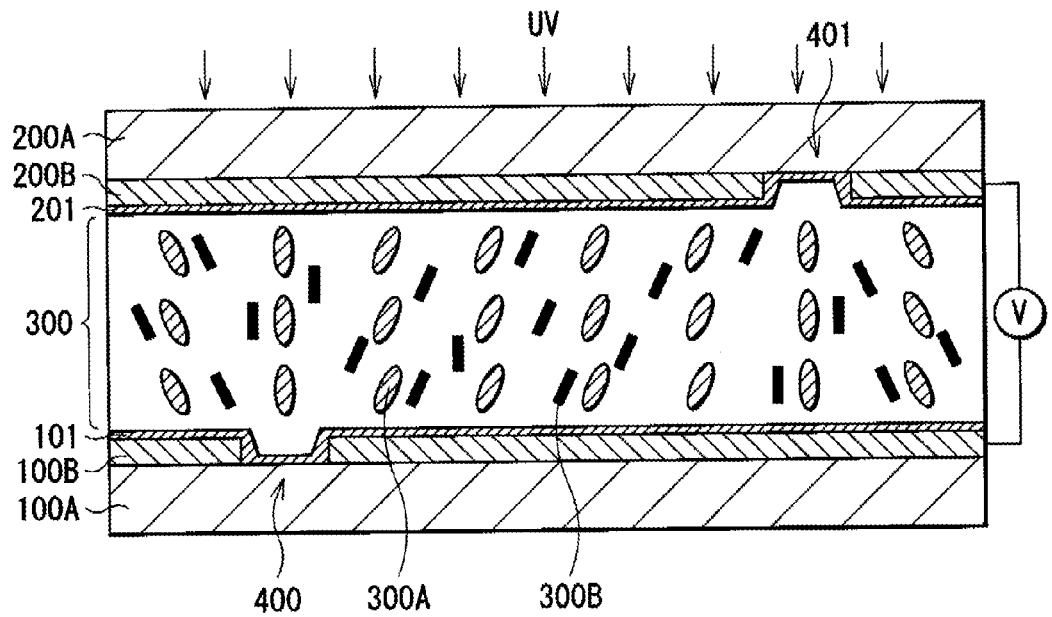
FIG. 9 is a schematic cross-sectional view for explaining a method of manufacturing a liquid crystal panel of related art.
Figure 10:
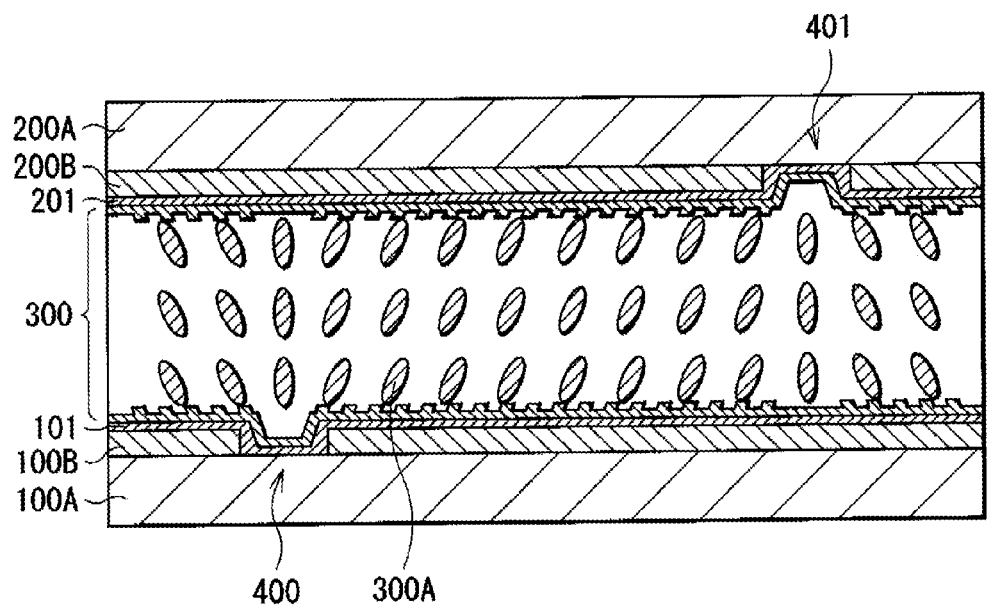
FIG. 10 is a schematic cross-sectional view of the liquid crystal panel manufactured by the method shown in FIG. 8.
Figure 11:
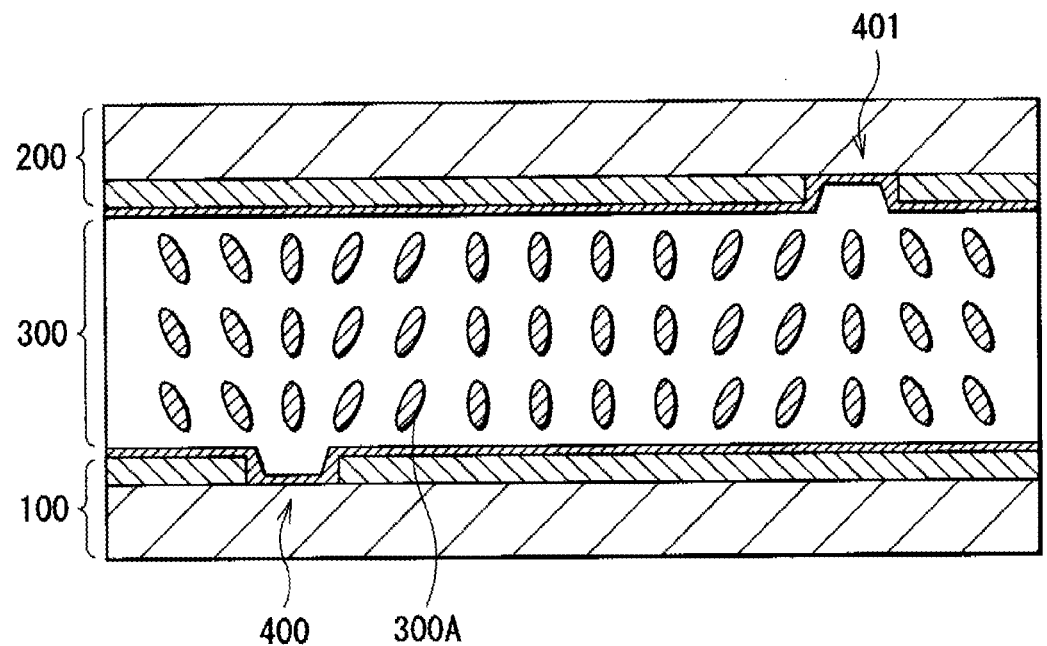
FIGS. 11 and 12 are schematic cross-sectional views for explaining the response speed of liquid crystal molecules against voltage.
Figure 12:
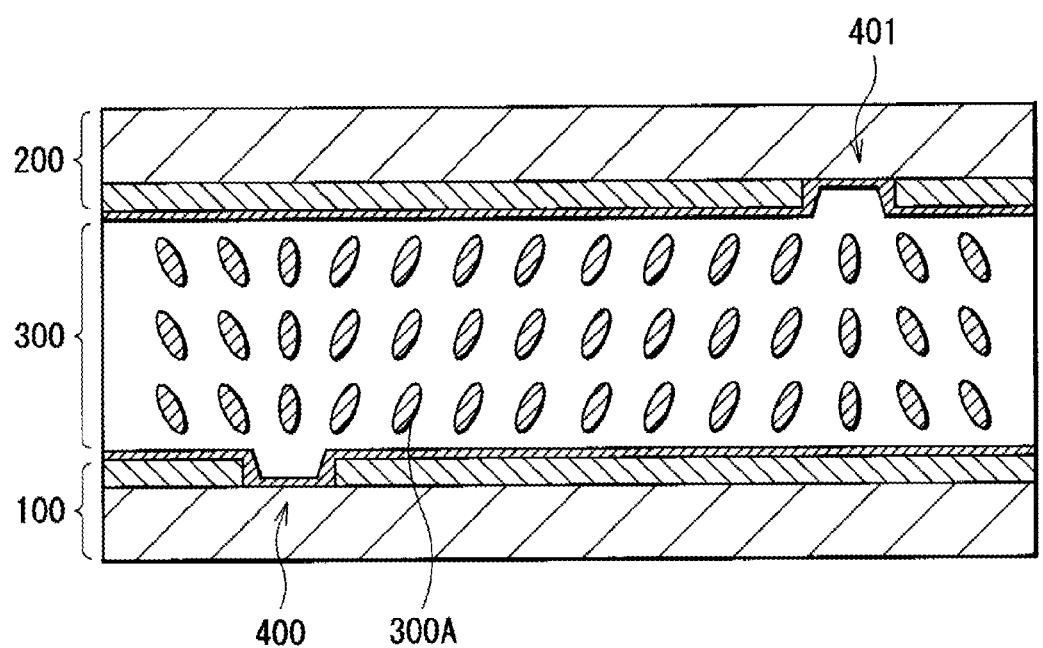

The openings 60A can have, for example, shapes and alignment patterns as shown in FIGS. 8A to 8H. Examples of their shape are circle, ellipse, square and rectangle. Examples of the alignment pattern are V-shaped patterns having an angle in the alignment as shown in FIGS. 8C and 8D, mesh-like patterns as shown in FIGS. 8E and 8F, and stripe-like patterns as shown in FIGS. 8G and 8H.

Preferably, the alignment pattern of the openings 60A is determined in consideration of the specification of the liquid crystal display, the arrangement pattern of the slit parts in the electrodes, and the like. For example, the stripe-like patterns as shown in FIGS. 8G and 8H are preferable when using the electrodes having the stripe-like slit part patterns as shown in FIGS. 5 and 6. In this case, it is arranged so that the longitudinal direction of the slit parts 40 and 41 are parallel to the stripe direction of the openings 60A. Alternatively, the patterns as shown in FIGS. 8C and 8D are preferable when using the electrodes having the V-shaped pattern of the slit parts as shown in FIG. 7A. More preferable is a mesh-like pattern having a repetitive cycle at constant spacing.

Figure 4:
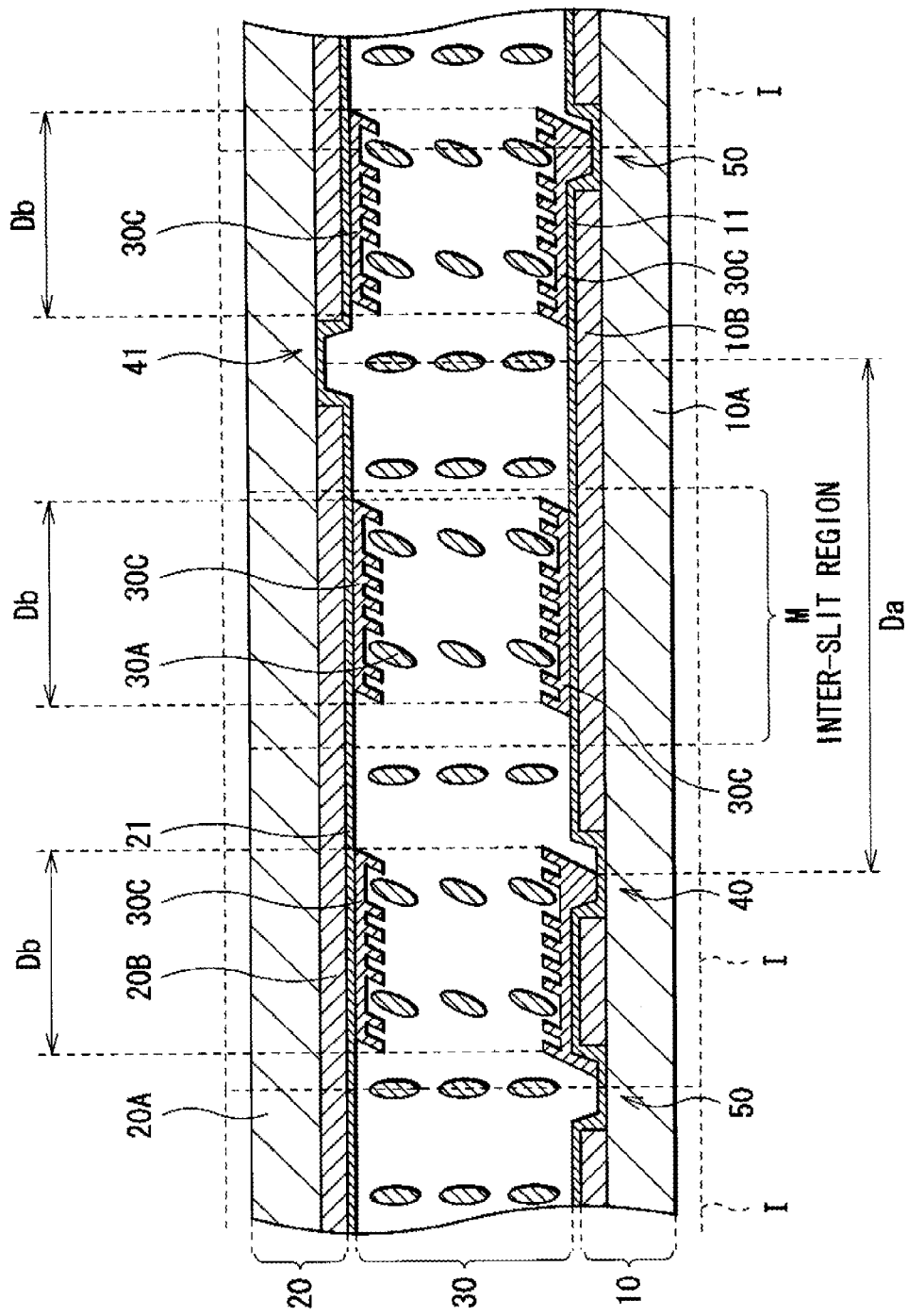
FIG. 4 is a schematic cross-sectional view of the liquid crystal panel in the preferred embodiment.

After the foregoing steps, the mask 60 is removed, resulting in the liquid crystal panel according to the present preferred embodiment as shown in FIG. 4. In the liquid crystal panel, the liquid crystal layer 30 is sealed between the TFT board 10 and the CF board 20, with the vertical alignment films 11 and 21 in between. The pixel electrodes 10B and the opposed electrode 20B formed on the boards 10 and 20, respectively, have the slit parts 40 and 41 not being opposed to each other within the pixel. The spacing between the regions having the polymer layer 30C is smaller than the slit spacing Da. In a region of the liquid crystal layer 30, particularly in the middle of the slit part 40 and the slit part 41 (an inter-slit region M), the liquid crystal molecules 30A, particularly those in the vicinity of the interface between the orienting films 11 and 21 are fixed and slightly tilted to the normal lines of the boards, namely held in a pre-tilt state by the polymer layer 30. The polymer layer 30C corresponds to the light curing layer of the present invention, and is for obliquely aligning liquid crystal molecules 30A. Alternatively, a plurality of the polymer layers 30C may be formed in the inter-slit region M.

A description will next be made of the effects of the method of manufacturing a liquid crystal panel and the liquid crystal panel as described above.

In the method of manufacturing a liquid crystal panel of the present embodiment, an electric field having an angle with respect to the long axes of the liquid crystal molecules 30A (hereinafter referred to as an oblique electric field) by sealing the liquid crystal layer 30 containing the monomers 30B having the light curing property, between the TFT board 10 and the CF board 20 provided with the pixel electrode 10B and the opposed electrode 20B having the predetermined slit parts 40 and 41, respectively, and then applying a predetermined voltage V. This enables the liquid crystal molecules 30A to be oriented in a tilted position in a certain direction.

By irradiating the ultra-violet light UV, through the mask 60 having the plurality of openings 60A, to the liquid crystal layer 30 with the voltage V applied, the orientation state of the liquid crystal molecules 30A regulated by the oblique electric field can be determined only in a selective region by the polymer layer 30C, resulting in the pre-tilt state. Particularly, by setting the opening pitch Db to be smaller than the slit spacing Da, the inter-slit region M, having a lower response speed against voltage than the slit-proximate region having a high response speed against voltage, can be exposed with a high probability. This permits effective improvement of the response speed against voltage of the liquid crystal panel as a whole. On the other hand, the pre-tilt angle is imparted only to the region in the liquid crystal layer 30 where the polymer layer 30C is formed, and in other regions, the liquid crystal molecules 30A are oriented vertically to the boards 10 and 20. Hence, the increase of luminance in black display (under the driving voltage is zero) can be suppressed in the liquid crystal panel as a whole. It is therefore possible to manufacture the liquid crystal panel enabling improvement of the response speed against voltage, while suppressing a drop in contrast.

In particular, the liquid crystal panel can be manufactured in simple steps, without the step of preparing a mask corresponding to the pattern shape of the slit parts of the respective electrodes, and the step of performing precise alignment using the mask thus prepared. For example, position accuracy of approximately 5 μm is required for the method including the step of aligning the openings of a mask formed so as to correspond to the slit pattern in an inter-slit region, and the step of exposure. That is, the alignment is extremely difficult. Slight misalignment limits the exposure to a region in the vicinity of the slit, failing to satisfactorily obtain the effect of the pre-tilt. On the other hand, in the present embodiment, with a certain degree of accuracy, the response speed against voltage can be increased in the liquid crystal panel as a whole, without performing any precise alignment. This is advantageous for reducing the manufacturing costs and improving mass production.

A high probability of selective exposure of the inter-slit region M can be obtained by setting the opening pitch Db to be smaller than a half of the slit spacing Da. The probability that the openings 60A are aligned immediately above the slit parts 40 and 41 can be vanished by setting so that the length ratio of the opening pitch Db and the slit spacing Da becomes an irrational number. If the openings 60A are aligned immediately above the slit parts 40 and 41, the polymer layer 30C may be formed in a region having a high response speed (namely, the region where there is no need to form the polymer layer 30C for imparting the pre-tilt). Avoidance of this matter permits an equivalent increment of the probability that the polymer layer 30C is formed in the region having a low response speed. As described above, having zero-probability of alignment between the openings 60A and the slit parts 40 and 41 enables the polymer layer to be formed with efficient distribution, while avoiding any useless matter. This leads to effective uniform improvement of the response speed in the panel as a whole.

Figure 7B:
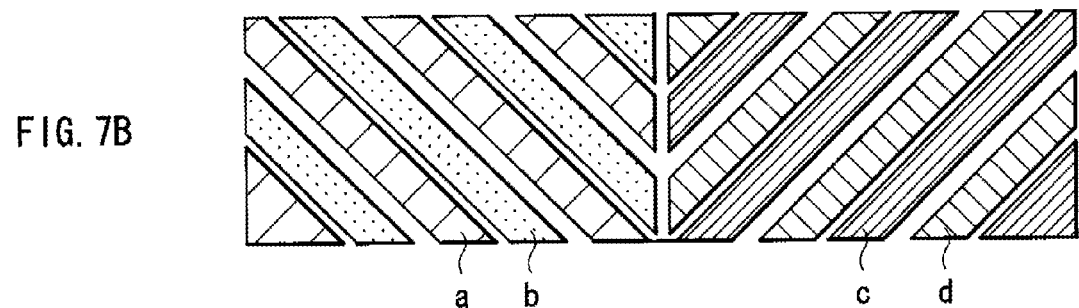
Figure 7C:
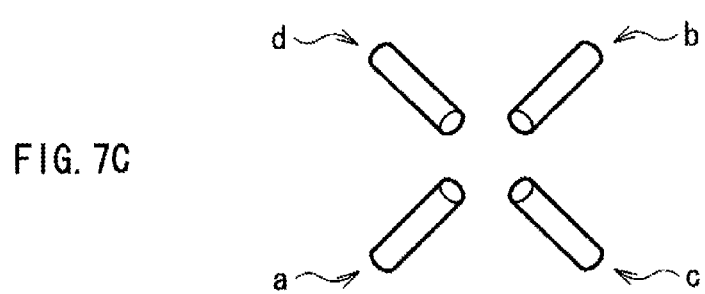

Further, arrangements of the slit parts 40 and 41 in the pattern as shown in FIG. 7A enable coexistence (domain division of alignment) of four regions a, b, c and d having different orientation directions within a pixel, as shown in FIG. 7B. In this case, in these regions a, b, c and d, the orientation directions of the liquid crystal molecules 30A having the pre-tilt angle are as shown in FIG. 7C. This enables manufacture of the liquid crystal panel having excellent viewing angle characteristic. It should be noted that all the liquid crystal molecules 30A per region are not oriented in the directions as shown in FIG. 7C, and at least part of the liquid crystal molecules 30A per region is oriented vertically to the boards.

Alternatively, with arrangement of the openings 60A of the mask 60 in a mesh-like pattern having a repetitive cycle, the pre-tilt angle can be provided uniformly in the inter-slit region M irrespective of the slit pattern of the electrodes, without performing any precise alignment in an in-plane direction on the panel. This permits more efficient improvement of the response speed against voltage.

In the liquid crystal panel of the present embodiment, when a driving voltage is applied to the pixel electrode 10B and the opposed electrode 20B provided with the slit parts 40 and 41 having a predetermined pattern, an electric field is exerted obliquely on the liquid crystal layer 30. In response to this, the liquid crystal molecules 30A lie in a certain direction. At this time, the polymer layer 30C can be surely provided for the regions in the liquid crystal layer where the response speed against voltage is low, by the arrangement that the spacing between the polymer layers 30C (light curing layers) for holding the liquid crystal molecules 30A in the pre-tilt state is smaller than the slit spacing Da. The presence of the polymer layers 30C ensures that the liquid crystal molecules in the region having a low response speed are held in the pre-tilt state. In a region having no polymer layer 30C, the liquid crystal molecules cannot be held in the pre-tilt state, and oriented vertically to the boards. No issues will occur because if it is the slit-proximate region, this region naturally has a high response speed. Also in the region having no polymer layer 30C, the liquid crystal molecules are oriented vertically to the boards, and this is advantageous for black display. It is therefore possible to efficiently improve the response speed against voltage, while suppressing a drop in contrast.

While the present invention has been described by the foregoing embodiment, without limitation, many changes and modifications may be made. For example, though the TFT liquid crystal has been described in the foregoing embodiment, the present invention is also applicable to plasma address liquid crystal displays or simple matrix liquid crystal displays. Although the VA mode liquid crystal display having the negative anisotropy of dielectric constant has been described above, without limitation, the present invention is applicable to any apparatuses for performing display by applying a voltage to liquid crystal sealed between boards.

It should be understood by those skilled in the art that various modifications, combinations, sub-combinations and alterations may occur depending on design requirements and other factors insofar as they are within the scope of the appended claims or the equivalents thereof.

What is claimed is:

1. A method of manufacturing a liquid crystal display comprising the steps of:
    forming pixel electrodes on inside surfaces of a couple of substrates facing each other, each of the pixel electrodes having gaps;
    sealing, between the couple of substrates with the pixel electrodes formed, a liquid crystal layer containing a light curing material; and
    exposing the liquid crystal layer through use of a light shielding film having a plurality of openings, under a voltage applied between a pair of pixel electrodes facing each other on the couple of substrates, wherein
    the gaps are alternately disposed to form a staggered arrangement between the pair of pixel electrodes and,
    spacing between adjacent openings of the light shielding film is smaller than spacing, in a substrate surface direction, between the gap of a pixel electrode on one substrate and the gap of a pixel electrode on the other substrate,
    wherein,
        a ratio of the spacing between adjacent openings of the light shielding film, to the spacing in a substrate surface direction between the gap of a pixel electrode on one substrate and the gap of a pixel electrode on the other substrate is an irrational number.

2. The method of manufacturing a liquid crystal display according to claim 1, wherein the plurality of openings of the light shield film are arranged in a mesh pattern, a lattice pattern or stripe pattern.

3. The method of manufacturing a liquid crystal display according to claim 1, wherein
    the gaps are formed in a stripe pattern along the surfaces of the couple of substrates, and
    the plurality of openings of the light shielding film are formed in a stripe pattern in parallel with the longitudinal direction of the gaps.

4. The method of manufacturing a liquid crystal display according to claim 1, wherein
    the gaps are formed in a V-shaped stripe pattern along the surfaces of the couple of substrates, and
    the plurality of openings of the light shielding film are formed in a V-shape pattern along the shape of the gaps.

* * * * *